US009354631B2

(12) United States Patent
Mohideen et al.

(10) Patent No.: US 9,354,631 B2
(45) Date of Patent: May 31, 2016

(54) HANDHELD DEVICE RENDERING OF PLANT MODEL PORTION BASED ON TASK (75) Inventors: Mohammed Ibrahim Mohideen, Karnataka (IN); Bas Broers, Abu Dhabi (AE); Lokantha Reddy J., Karnataka (IN); Sushma Ramesh, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 627 days.

(21) Appl. No.: 13/608,363

(22) Filed: Sep. 10, 2012

(65) Prior Publication Data

US 2014/0074273 A1    Mar. 13, 2014

(51) Int. Cl.
*G06F 19/00*     (2011.01)
*G05B 19/418*    (2006.01)
*G06Q 10/10*     (2012.01)

(52) U.S. Cl.
CPC ........ *G05B 19/41885* (2013.01); *G06Q 10/103* (2013.01); *G05B 2219/31472* (2013.01); *G05B 2219/31473* (2013.01); *G05B 2219/36159* (2013.01); *Y02P 90/14* (2015.11); *Y02P 90/18* (2015.11); *Y02P 90/26* (2015.11)

(58) Field of Classification Search
CPC ..... G06F 17/50; G06T 19/00; A61C 13/0004; G05B 19/4097; G05B 19/4099
USPC .......................................................... 700/98
See application file for complete search history.

(56) References Cited

U.S. PATENT DOCUMENTS

| | | | |
|---|---|---|---|
| 6,710,776 B2* | 3/2004 | Usaki ..................... | G01C 21/00 700/83 |
| 2005/0209902 A1 | 9/2005 | Iwasaki et al. | |
| 2008/0198168 A1 | 8/2008 | Jiao et al. | |
| 2009/0065578 A1* | 3/2009 | Peterson et al. ............. | 235/382 |
| 2011/0047115 A1 | 2/2011 | Johnson et al. | |
| 2011/0229021 A1 | 9/2011 | Mei | |
| 2012/0019522 A1 | 1/2012 | Lawrence et al. | |
| 2012/0079112 A1 | 3/2012 | Buer et al. | |
| 2013/0094666 A1* | 4/2013 | Haff et al. .................... | 345/660 |

* cited by examiner

*Primary Examiner* — Sean Shechtman
*Assistant Examiner* — Derrick Boateng
(74) *Attorney, Agent, or Firm* — Jetter & Associates, P.A.

(57) ABSTRACT

A method of operating an industrial plant having processing units on a production floor which includes a wireless network including a network server having stored a two-dimensional (2D) plantwide model and a 3D plantwide model showing the processing units. At least a first worker is on the production floor. The first worker is provided a first handheld computing device having a wireless transceiver, a processor programmed to implement a model rendering algorithm stored in an associated memory, and a display. Based on a task defined for the first worker to execute involving at least a first processing unit of the processing units, a model portion of the 2D plantwide model or 3D plantwide model involved in the task including the first processing unit is identified. An image representation of the model portion is then rendered on the display.

13 Claims, 5 Drawing Sheets

HANDHELD DEVICE RENDERING OF PLANT MODEL PORTION BASED ON TASK

FIELD

Disclosed embodiments relate to handheld (wireless) computing devices and software for handheld computing devices that display information which aid workers at industrial plants with their tasks/activities, including day-to-day operation of the plant.

BACKGROUND

Some commercially available software products enable plant workers (e.g., engineers, managers, technicians and operators) to remotely address problems in the field to help keep industrial plant equipment running within safe operating limits and at optimum performance. For example, one such software product is Honeywell International's FIELD ADVISOR. The FIELD ADVISOR is a software package used by plant workers having handheld computing devices in conjunction with a wireless local area network (WLAN).

For example, the FIELD ADVISOR can improve overall plant efficiency and reliability by recording critical asset data and by ensuring the data falls within safe operating limits. If the equipment is operating outside the plant's set limits, the Field Advisor guides the worker (e.g., operator) through the necessary steps to correct the problem. For example, when an asset exceeds critical (operating) limits, appropriate actions are not always apparent to the operator and the wrong decision can have a wide range of undesirable consequences. The FIELD ADVISOR can provide information that ensures the worker considers operating limits up front, which can improve overall production efficiency and safety.

The FIELD ADVISOR running on the operator's handheld computer device can be used in conjunction with a wireless mesh network. This solution allows the workers to download specific tasks and instructions (from the network server), and then upload results (to the network server) for reporting after the tasks are completed. Such communications helps plant maintenance, operations, and reliability teams share information between them more quickly, supervisors plan shift workloads more effectively, and allows new workers (e.g., operators) to be trained at a faster pace.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize although known software packages for handheld (mobile) computing devices for industrial plant workers (e.g., engineers, managers, technicians and operators) can improve overall plant efficiency and reliability, a complex work environment, equipment layout and material flow in a plant limits the situational awareness (SA) of plant workers despite having a handheld computing device. Lack of sufficient SA can lead to incomplete/incorrect field operations with stray incidents reporting.

Disclosed embodiments provide handheld computing devices which render model representations that are task (or work flow)-based which represent portions of 2D plantwide models and/or 3D plantwide models of the industrial plant which enhances SA for plant workers. Disclosed embodiments also include software packages for rendering information on the display device of handheld computing devices for plant workers based on the task/activity the plant worker is currently involved in.

In one embodiment the image representation of the plant layout and processing equipment (processing units) uses a combination of a 2D plantwide model and a 3D plantwide model. In a typical embodiment, while the worker is on the production floor, a portion of a 2D plantwide model (e.g., Google map) and 3D plantwide model which corresponds to the plant area adjoining the processing units upon which the task(s) are to be executed are wirelessly loaded from the memory of a server to the handheld device. However, the loading of the models to the handheld computing device can be performed offline as well, such as by docking the handheld communication device into the server at the control room to download all models (plantwide 2D and 3D models) into the handheld communication device before going out to the production floor.

The availability of worker' location information (derived from GPS or Wi-Fi) enables implementing the 2D and 3D plantwide models as moving models, where the location information allows the rendered view to reflect the new position (equipment in the view changes as the worker moves). However, location is just one optional input to allow rendering a representation of a model portion of a plantwide model relevant to a task/work flow including processing units. The rendering can be triggered by the worker themselves without using location information. The assigned tasks and processing units involved in the operation can be distinctly highlighted (e.g., with different color and/or texture) against other equipment and features (e.g., piping) in the rendered image representation.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Figure 1:
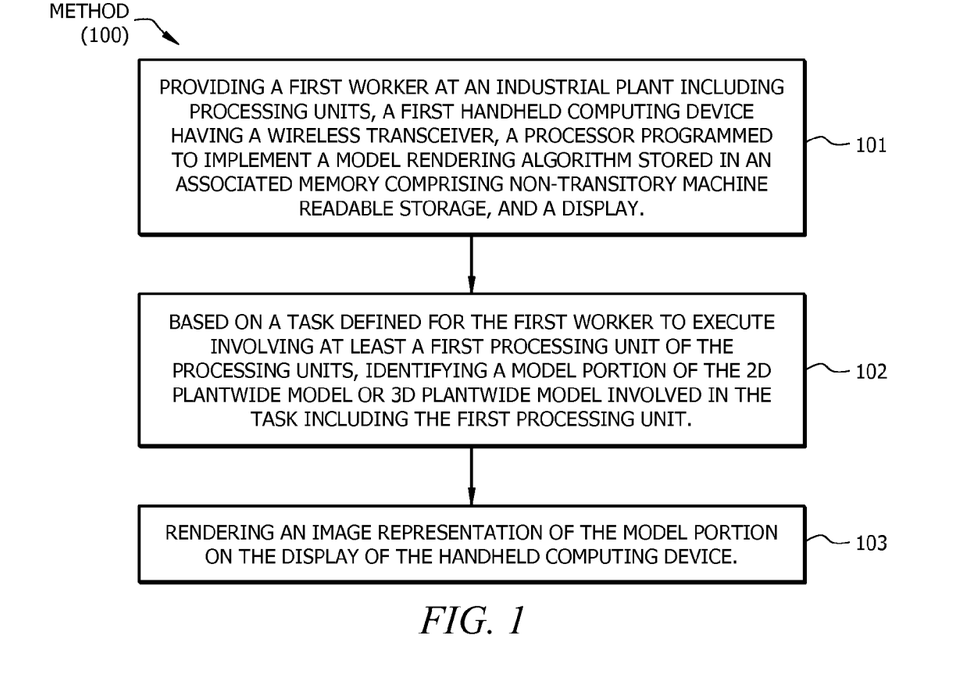
FIG. 1 is a flow chart that shows steps in a method of operating an industrial plant where the plant workers have a disclosed handheld computing device having a model rendering algorithm, according to an example embodiment.

FIG. 1 is a flow chart that shows steps in a method 100 of operating an industrial plant having processing units on a production floor which includes a wireless network including a network server having stored a two-dimensional (2D) plant-wide model and a 3D plantwide model each showing the processing units. Several variants of 2D plantwide models can be used including a hierarchical view, discipline-based view, route or location-based view, and unit or area-based view. The emergence of the Building Information Modeling (BIM) concept and its applications has lead to development of several toolsets for constructing 3D models from 2D models. Disclosed embodiments can use such toolsets for generating a 3D model of plant from a 2D model of a plant.

There are a plurality of plant workers including a first worker on the production floor. The model is generally configured in a flowsheet configuration showing the processing units coupled together by piping or other flow conduits. The task or group of tasks can be defined/identified based on a predetermined automated schedule, or based on need as determined by a supervisor.

Step 101 comprises providing the first worker a first handheld computing device having a wireless transceiver, a processor programmed to implement a model rendering algorithm stored in an associated memory comprising non-transitory machine readable storage (e.g., static RAM), and a display. The plant workers can each have a disclosed handheld computing device having a disclosed model rendering algorithm for rendering a model portion of the plantwide 2D or plantwide 3D models based on the assigned task.

In step 102, based on a task defined for the first worker to execute involving at least a first processing unit of the processing units, identifying a model portion of the 2D plantwide model or 3D plantwide model involved in the task including the first processing unit. The identifying algorithm for identifying the model portion based on the assigned task can reside at the server and/or at the handheld computing device. (For example, the model image/diagram can be part of asset or task description in the device). In the embodiment the identifying algorithm for identifying the model portion based on the assigned task resides at the handheld computing device, the handheld computing device also stores a copy of the 2D and 3D plantwide models.

The tasks (or workflow) can involve numerical/text/predefined list of alternates/positive confirmations (Barcode/RFID), measurement (pressure, temperature, vibration, etc.), selection from given set of alternatives, or reconditioning (e.g., preventive maintenance). In addition to rendering the processing unit involved in the task at hand, the model portion identified generally also includes the region around the processing unit involved in the task so that the rendered image (step 103) includes the region around the processing unit involved in the task to provide a higher level of SA to the worker.

As noted above, the stored models and the identifying algorithm for identifying the model portion based on the assigned task can reside at the server, and can also reside at the handheld computing device. In the embodiment the stored models and identifying algorithm are stored only at the server, the method further comprises wirelessly transmitting the model portion from the network server to the handheld computing device while the worker is on the production floor.

Step 103 comprises rendering an image representation of the model portion on the display of the handheld computing device. The availability of optional location information (derived from GPS or Wi-Fi) enables implementing 2D models and 3D models as moving models. Other relevant information as derived from accelerometers, or compass devices can also be used for deciding what to display in the rendered view. The assigned tasks and processing unit involved in the operation/task can be distinctly highlighted (e.g., with different color, texture) against other equipment in the rendered model portion.

As the worker ventures toward the site for actual task execution, in the embodiment worker's location information is available, the handheld device renders a 2D moving model of the plant portion along with highlighted spots of equipment location (e.g., as pop up icons). As the worker nears the location of the equipment involved in the task, a corresponding 3D model portion can be rendered automatically. Alternatively, upon user (manual) selection, switching over from 2D to 3D model portion may be rendered.

In addition to task related information, optionally, other information such as material flow, geo-fencing, muster points and hazardous zones may also be overlaid on the image rendered or placed in a text portion of the display. Configuration information can include the workgroup, task type, route selection (one or more routes may exists for a plant) which may also be displayed. In addition to route selection to reach a location within the plant, optional textual support for asset location information may also be provided. The models may also be rendered outside the production floor, such as at a controller station in a control room for supervisor' viewing.

In several instances, assets of same type are present in multiple numbers within proximity. As known in the art, the workers having handheld computing devices may use barcode or RFID tags to identify the equipment for which a task has been assigned. As described above, by rendering differently (e.g., color/texture) equipment involved in a task to be executed on the handheld computing device, the worker can now instead uniquely identify the equipment remotely.

The wireless network in one particular embodiment can comprise a wireless mesh network (WMN) which is a special type of wireless ad-hoc network, where the communications network is made up of radio nodes organized in a mesh topology (see FIG. 3 described below). Wireless mesh networks comprise mesh clients, mesh routers and gateways. The mesh clients are wireless devices while the mesh routers forward traffic to and from the gateways, which may but need not connect to the Internet. A mesh network is reliable and offers redundancy, so that when one node can no longer operate, the rest of the nodes can still communicate with each other, directly or through one or more intermediate nodes. As known in the art, wireless mesh networks can be implemented with various wireless technology including IEEE802.11, 802.15, 802.16, cellular technologies or combinations of more than one type. The wireless network can comprise a Wi-Fi mesh network, Global System for Mobile Communications (GSM), 3G, or other wireless network compatible with handheld computing devices.

In one particular embodiment the handheld computing device can be based on the DOLPHIN 99EX mobile computer provided by Honeywell International including a GPS and associated software together with a disclosed model rendering algorithm, or other similarly rugged field mobile computing devices. The GPS wirelessly obtains location information that identifies a physical location for the first worker, and adds the location information to wireless transmissions of information from the first worker to the other plant workers and/or to the network server.

Alternatively to GPS, if location information is utilized by the model rendering algorithm, the handheld computing device can calculate its physical location from timing information including timing information obtained from the network server, such as based on Timing Measurement Action (TMA) frames (e.g., as disclosed in the IEEE 802.11v specification). However, the determination of the physical location of the worker need not be based on timing information. For example, Wi-Fi may use a known mechanism to calculate location that is not based on timing information. Another source of location information useful for the worker can be based on barcode reading when barcodes are distributed throughout the facility/industrial plant, which can provide the location information for assets in the plant including the processing units. In this embodiment, the handheld computing device includes a camera and software for reading the bar code image data sensed by the camera. The bar code can provide location information. Similarly, another source of location information useful for the worker can be provided by Radio-frequency identification (RFID) tags when the processing units include RFID tags. In this embodiment, the handheld device includes RFID reader software.

Figure 2:
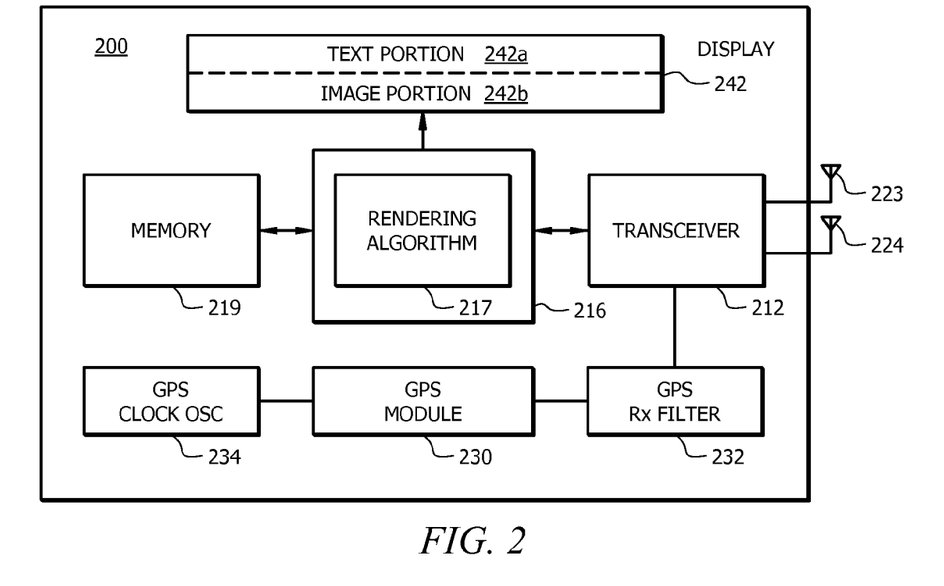
FIG. 2 is a block diagram depiction of an example handheld computing device having a model rendering algorithm and optional global positioning system (GPS), according to an example embodiment.

FIG. 2 is a block diagram depiction of an example handheld computing device 200 having a model rendering algorithm and optional GPS, according to an example embodiment. Computing device 200 includes a processor 216 programmed to implement a model rendering algorithm 217 stored in non-transitory machine readable storage shown as memory 219, and a display 242 for displaying the image representation of the model portion. Display 242 is shown including a text portion 242a and an image portion 242b. As described above, memory 219 may also optionally store the 2D and 3D plantwide models, as well the identifying algorithm for identifying the model portion to be rendered in an image representation based on the assigned task.

The handheld computing device 200 is adapted to be involved in operating an industrial plant (e.g., see industrial plant 300 shown in FIG. 3 described below) having processing units and a wireless network including a network server, at least one router and a plurality of workers. The handheld computing device 200 can include an algorithm stored in memory 219 and executed by processor 216 which adds location information for the handheld computing device automatically to wireless transmissions of information by the worker to other plant workers and/or to the network server.

Handheld computing device 200 includes a wireless transceiver 212. The transceiver 212 is coupled to an antenna 223. Handheld computing device 200 also includes a GPS clock oscillator 234 coupled to GPS module 230, where the GPS module 230 is coupled to the transceiver 212 through GPS Rx filter 232, and the transceiver 212 is also coupled to a GPS antenna 224.

Figure 3:
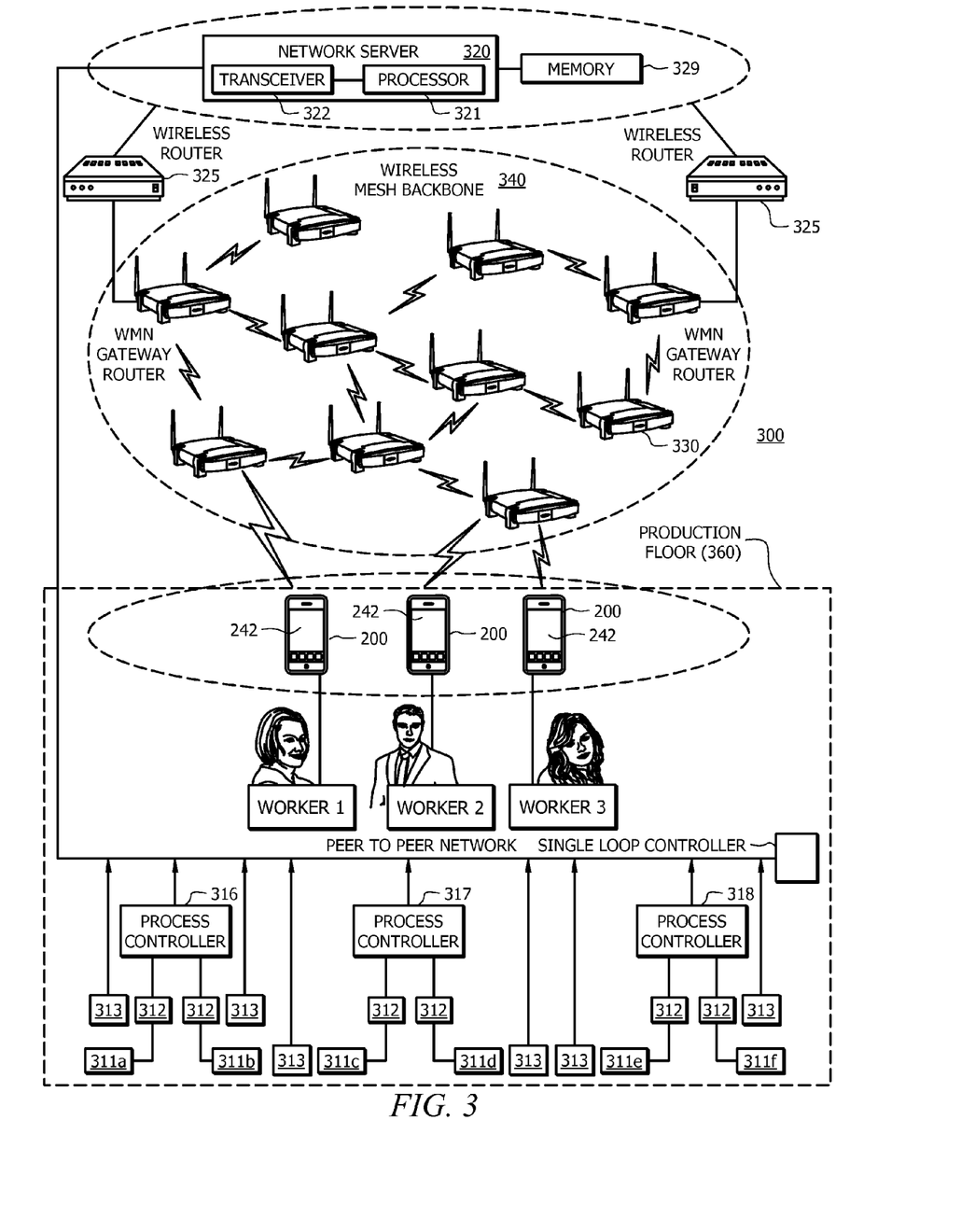
FIG. 3 is a block diagram of an industrial plant comprising processing units, along with a wireless communications network including a network server, at least one router, and a plurality of operators having disclosed handheld computing devices having model rendering algorithms, according to an example embodiment.

FIG. 3 is a block diagram of an industrial plant 300 comprising a production floor 360 including processing units 311a-f, and actuators 312 and sensors 313 coupled to the processing units. The industrial plant 300 includes a wireless communications network including a network server 320, at least one router shown as wireless routers 325 and gateway routers 330 arranged in a wireless mesh backbone 340. A plurality of workers shown as workers 1, 2 and 3 each having a disclosed handheld computing device 200 are on the production floor 360. As described above relative to FIG. 2, handheld computing devices 200 include a wireless transceiver 212 and a processor 216 programmed to implement a disclosed model rendering algorithm stored in memory 219. The network server 320 includes a processor 321 and a wireless transceiver 322 for wirelessly sending plant information to the handheld computing devices 200, that can be a function of the physical location of the worker. Network server 320 is also coupled to a memory 329 that can store information including data for a data historian.

Industrial plant 300 is shown configured as a distributed control system (DCS) where the process controller elements 316-318 are not central in location, but are distributed throughout the industrial plant 300 with each component sub-system controlled by one or more controllers. Industrial plant 300 can implement activities such as oil refining, petrochemicals, central station power generation, fertilizers, pharmaceuticals, food and beverage manufacturing, cement production, steelmaking, papermaking, and gas processing.

Figure 4A:
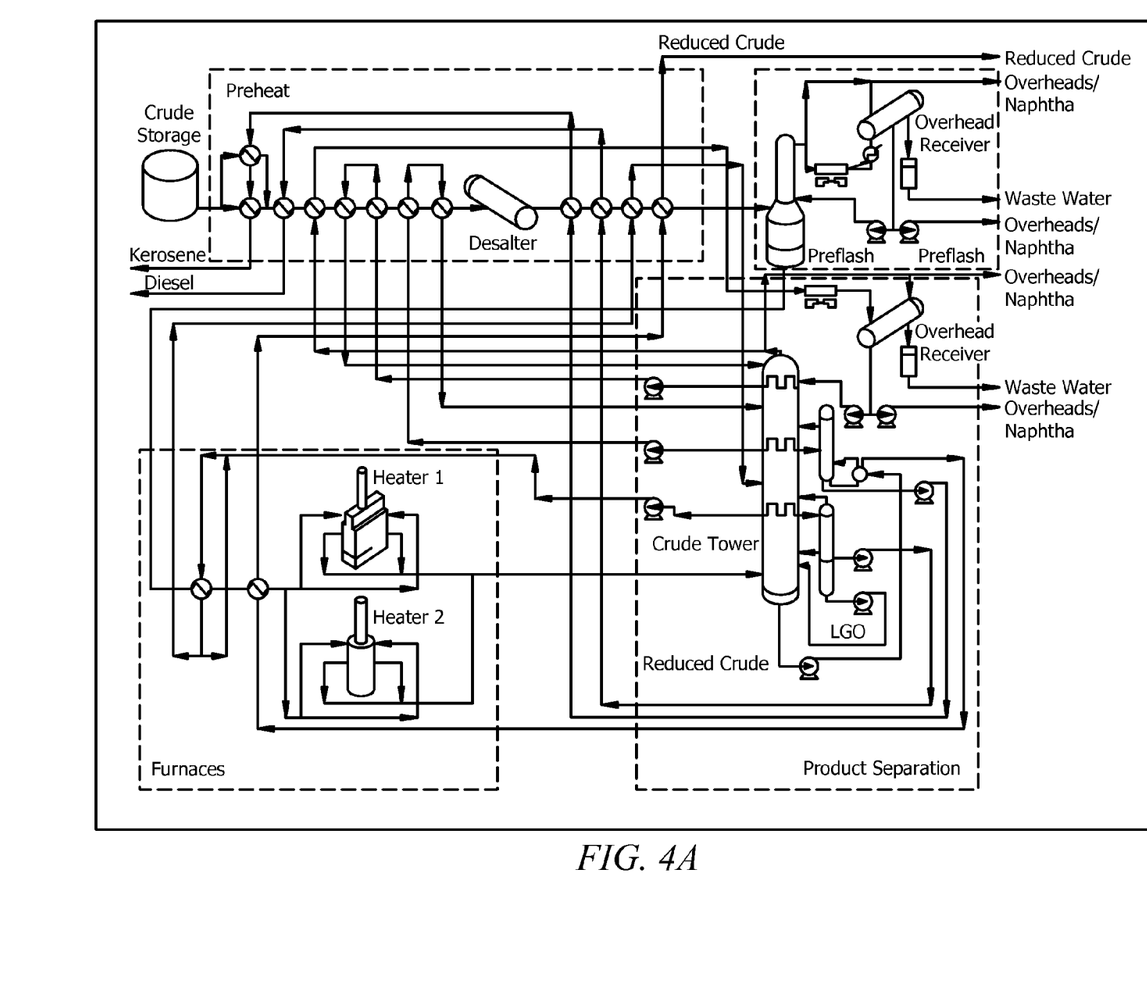
FIGS. 4A-C are examples of rendered images of a 2D plantwide model, a 3D model portion of the 2D plantwide model, and a representation in a 3D on 2D layered format, respectively, for an oil refinery, according to example embodiments.
Figure 4B:
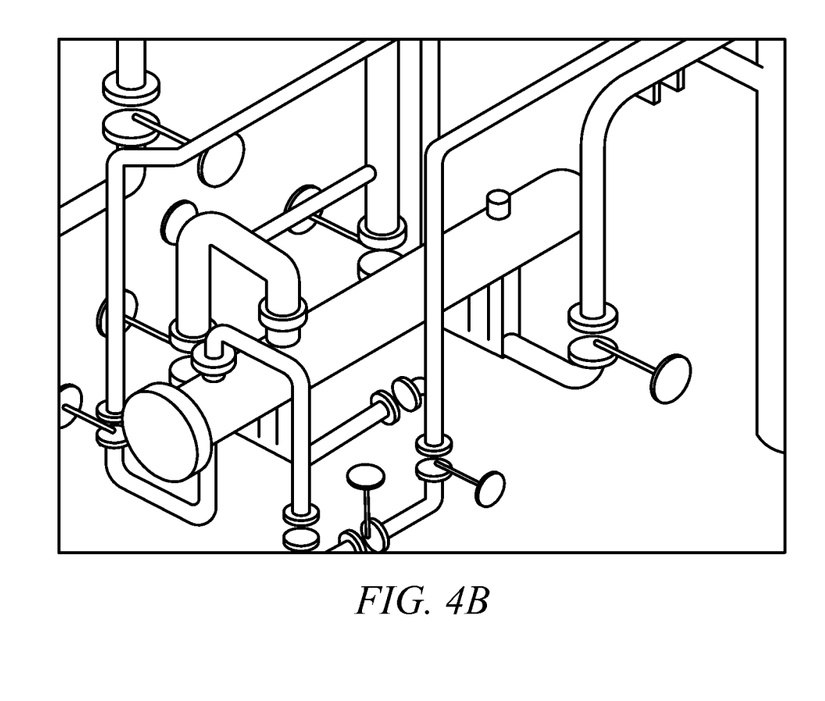
Figure 4C:
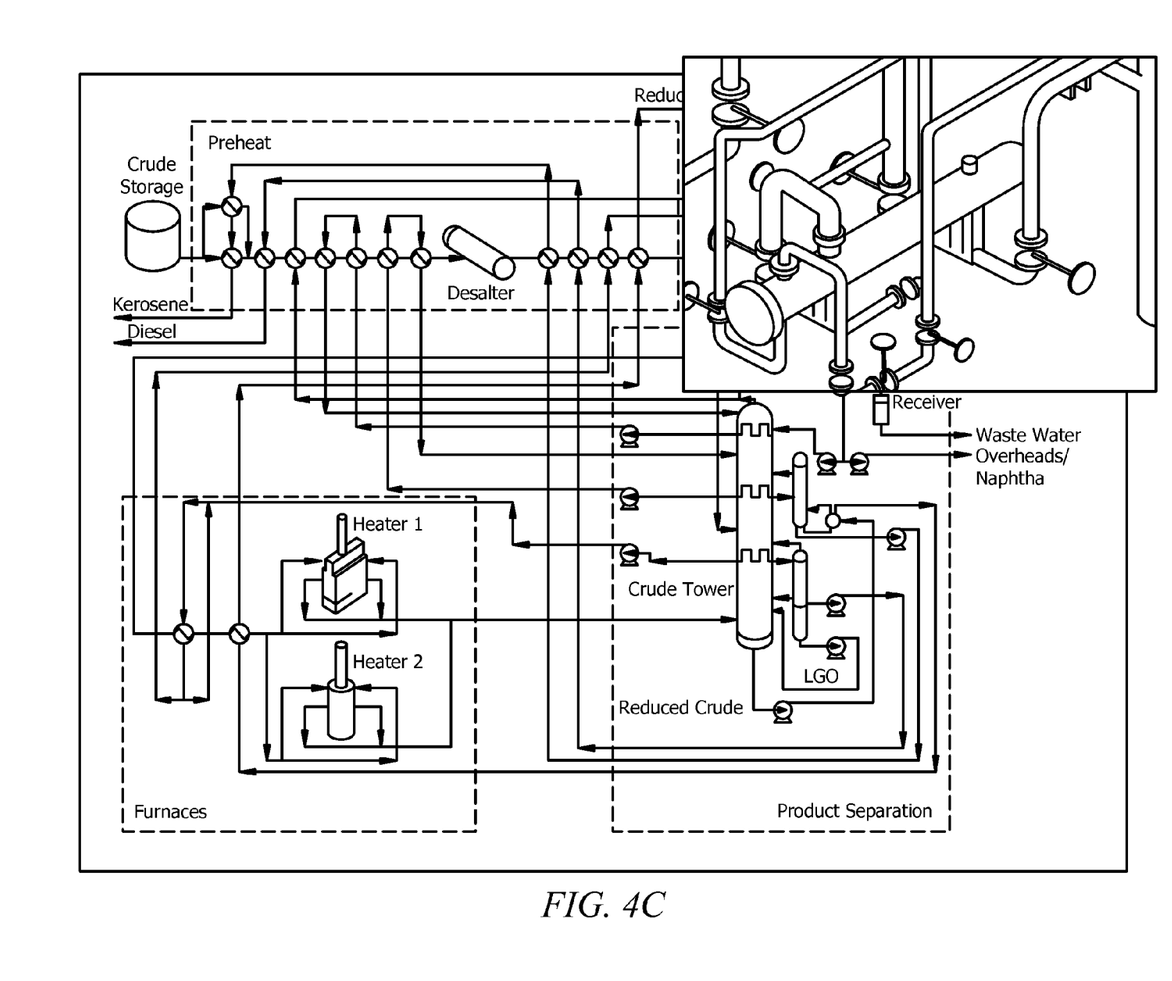

FIGS. 4A-C are examples of rendered images of a 2D plantwide model, a model portion of the 2D plantwide model, and a representation in a 3D on 2D layered format, respectively, for an oil refinery, according to example embodiments. The 3D representation shown in FIG. 4B can be triggered by the worker clicking on an icon within the image representation shown in FIG. 4A. The equipment for the task to be performed can be highlighted in different colors/textures relative to its surroundings in FIGS. 4A-C.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. For example, although generally described herein being provided by a network server, it is noted that any of the logic/applications based on physical location of worker disclosed herein may also be executed as cloud-based applications. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

Computer program code for carrying out operations of the disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The Disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a physical computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

We claim:

1. A method of operating an industrial plant having processing units on a production floor which includes a wireless network including a network server having stored a two-dimensional (2D) plantwide model and a 3D plantwide model showing said processing units, and at least a first worker on said production floor, comprising:
providing said first worker a first handheld computing device having a wireless transceiver,
a processor programmed to implement a model rendering algorithm for rendering model portions of said 2D or said 3D plantwide models based on tasks for said processing units stored in an associated memory comprising non-transitory machine readable storage, wherein said 2D or said 3D plantwide models are configured in a flowsheet configuration showing said processing units coupled together, and a display;
based on a task assigned for said first worker to execute involving at least a first processing unit of said processing units, identifying a model portion of said 2D plantwide model or said 3D plantwide model involved in said task including said first processing unit, and
rendering an image representation of said model portion on said display;
wherein as said first worker moves towards a location for execution of said task, said rendering algorithm renders said image representation of said model portion as a moving model, and wherein said first processing unit is represented differently in said image representation as compared to others of said processing units.

2. The method of claim 1, wherein said model portion comprises a portion of both said 2D plantwide model and said 3D plantwide model, and wherein said network server performs said identifying, further comprising wirelessly transmitting said model portion from said network server to said first handheld computing device while said first worker is on said production floor.

3. The method of claim 1, wherein said 2D plantwide model and said 3D plantwide model are downloaded from said network server to said memory of said first handheld computing device before said first worker is on said production floor, and wherein said first handheld computing device performs said identifying.

4. The method of claim 1, wherein said rendering is automatic based on a physical location for said first worker.

5. The method of claim 4, wherein said first handheld computing device includes a Global Positioning System (GPS) that provides said physical location for said first worker.

6. The method of claim 1, wherein said rendering an image representation comprises rendering a 2D representation at a first time, and then rendering a 3D representation at a second time after said first time.

7. The method of claim 6, wherein when said first worker reaches a predetermined distance from said first processing unit, said 3D representation is rendered automatically.

8. The method of claim 6, wherein said first worker triggers said rendering of said 3D representation.

9. The method of claim 6, wherein said 3D representation is overlaid on said 2D representation in said image representation.

10. A handheld computing device, comprising:
a processor programmed to implement a model rendering algorithm representing an industrial plant having processing units stored in an associated memory, said model rendering algorithm for rendering model portions of 2D or said 3D plantwide models based on tasks for said processing units, wherein said 2D or said 3D plantwide models are configured in a flowsheet configuration showing said processing units coupled together;
a wireless transceiver coupled to said processor, said wireless transceiver having an antenna coupled thereto,
and a display coupled to display images rendered by said model rendering algorithm;
wherein said rendering algorithm implements rendering of an image representation of a model portion on said display, said model portion being a portion of said 2D plantwide model or 3D plantwide model of said industrial plant selected based on a task assigned defined for a first worker having said handheld computing device to execute involving at least a first processing unit of said processing units;

wherein as said first worker moves towards a location for execution of said task, said rendering algorithm renders said image representation of said model portion as a moving model, and wherein said first processing unit is represented differently in said image representation as compared to others of said processing units.

11. The handheld computing device of claim 10, wherein said 2D plantwide model and said 3D plantwide model are stored in said memory of said handheld computing device, and wherein said handheld computing device performs identifying said model portion.

12. The handheld computing device of claim 10, wherein said rendering is automatic based on a physical location for said first worker.

13. The handheld computing device of claim 12, wherein said handheld computing device includes a Global Positioning System (GPS) that provides said physical location for said first worker.

* * * * *